United States Patent [19]
Gulde

[11] Patent Number: 5,174,589
[45] Date of Patent: Dec. 29, 1992

[54] CLAMPING DEVICE

[75] Inventor: Siegfried Gulde, Langenenslingen, Fed. Rep. of Germany

[73] Assignee: SMW Schneider & Weisshaupt GmbH, Meckenbeuren, Fed. Rep. of Germany

[21] Appl. No.: 761,679

[22] Filed: Sep. 18, 1991

[30] Foreign Application Priority Data

Sep. 19, 1990 [DE] Fed. Rep. of Germany ....... 4029625

[51] Int. Cl.⁵ .............................................. B23B 31/16
[52] U.S. Cl. .................................................. 279/124
[58] Field of Search ................ 279/123, 124, 152, 153

[56] References Cited

U.S. PATENT DOCUMENTS

| 2,667,358 | 1/1954 | Highberg ........................... 279/123 |
| 3,031,201 | 4/1962 | Neef .................................. 279/123 X |
| 3,219,356 | 11/1965 | Wilterdink et al. ................. 279/123 |
| 3,744,808 | 7/1973 | Hughes ............................ 279/123 X |
| 4,569,530 | 2/1986 | Cross ................................. 279/123 |
| 4,667,971 | 5/1987 | Norton et al. ................... 279/123 X |

FOREIGN PATENT DOCUMENTS

| 196215 | 3/1958 | Austria ................................ 279/123 |
| 2949566 | 6/1981 | Fed. Rep. of Germany . |

Primary Examiner—Steven C. Bishop
Attorney, Agent, or Firm—Robert W. Becker & Associates

[57] ABSTRACT

A chuck with radially adjustable base jaws and exchangeable clamping jaws is provided. The toothings of the base jaws intermesh with respective toothings of the clamping jaws. The base jaws and the clamping jaws are coupled by respective keys which are adjustable relative to one another by an amount corresponding at least to the height of the intermeshing toothings. The adjustment is carried out by a clamp bolt which extends through the shaft of the key and which is provided with a conical clamping surface. The clamp bolt is supported at a rotatably mounted threaded elements or spindle such that the key may be adjusted in the axial direction of the key shaft by the rotation of the threaded element or spindle due to the cooperation of respective counter surfaces provided at the threaded element or spindle with the clamping surfaces of the clamp bolt. Due to this arrangement it is possible to connect and release respective clamping jaws from the base jaws in a very short period of time. Furthermore, an extremely high stability of the base jaws-clamping jaws-arrangement is achieved so that very high forces may be transmitted.

27 Claims, 4 Drawing Sheets

CLAMPING DEVICE

BACKGROUND OF THE INVENTION

The present invention relates to a clamping device, especially a chuck for a turning lathe, a vise or similar machines, having radially adjustable base jaws that are, for example, guided within the chuck body, which may be individually or simultaneously actuated by a respective actuating member. The base jaws have toothings at a face thereof which engage toothings of exchangeable clamping jaws that are coupled to the respective base jaws via a respective key that is inserted into a respective guide groove which extends in the axial direction. The key is slidable by at least the amount of the height of the intermeshing toothings in an axial direction by an external control member.

A chuck of the aforementioned kind is known from DE-OS 29 49 566. For the axial adjustment of the key by the respective height of the intermeshing toothings a control member in the form of a clamping piece is provided which is inserted into a recess provided at the base jaws and is radially movable by a control spindle which is in a fixed position. Via slanted surfaces the adjustment movements of the clamping piece are transferred to the key. This embodiment is of a complicated design and very expensive to manufacture. Furthermore, due to the radially extending recesses within the base jaws which are required for receiving the clamping pieces the base jaws are of a weak structure and a high stability may not be ensured. The application range of such chucks is thus limited. Also, the adjusting movements of the control spindle are not directly transmitted to the key but are first transmitted to the champing piece and then via the slanted surfaces to the key. An exchange of jaws within a short period of time is thus impossible. The control spindle must be turned multiple times in order to move the key by the amount that corresponds to the height of the intermeshing toothings.

It is therefore an object of the present invention to provide a clamping device of the aforementioned kind with which an exchange of clamping jaws may be achieved within a short period of time and without difficulties and which further provides a rigid and high-load connection between the base jaws and the clamping jaws without impairing the stability of the clamping device by recesses. The required constructive expenditure should be kept at a minimum so that an economic manufacture and a versatile application range is achieved. Furthermore, the clamping jaws should be adjustable within a great radial range relative to the base jaws.

BRIEF DESCRIPTION OF THE DRAWINGS

This object, and other objects and advantages of the present invention, will appear more clearly from the following specification in conjunction with the accompanying drawings, in which:

FIG. 3a is a variation of the embodiment of FIG. 3;

FIG. 3b is a variation of the embodiment according to FIG. 3;

SUMMARY OF THE INVENTION

Figure 1:
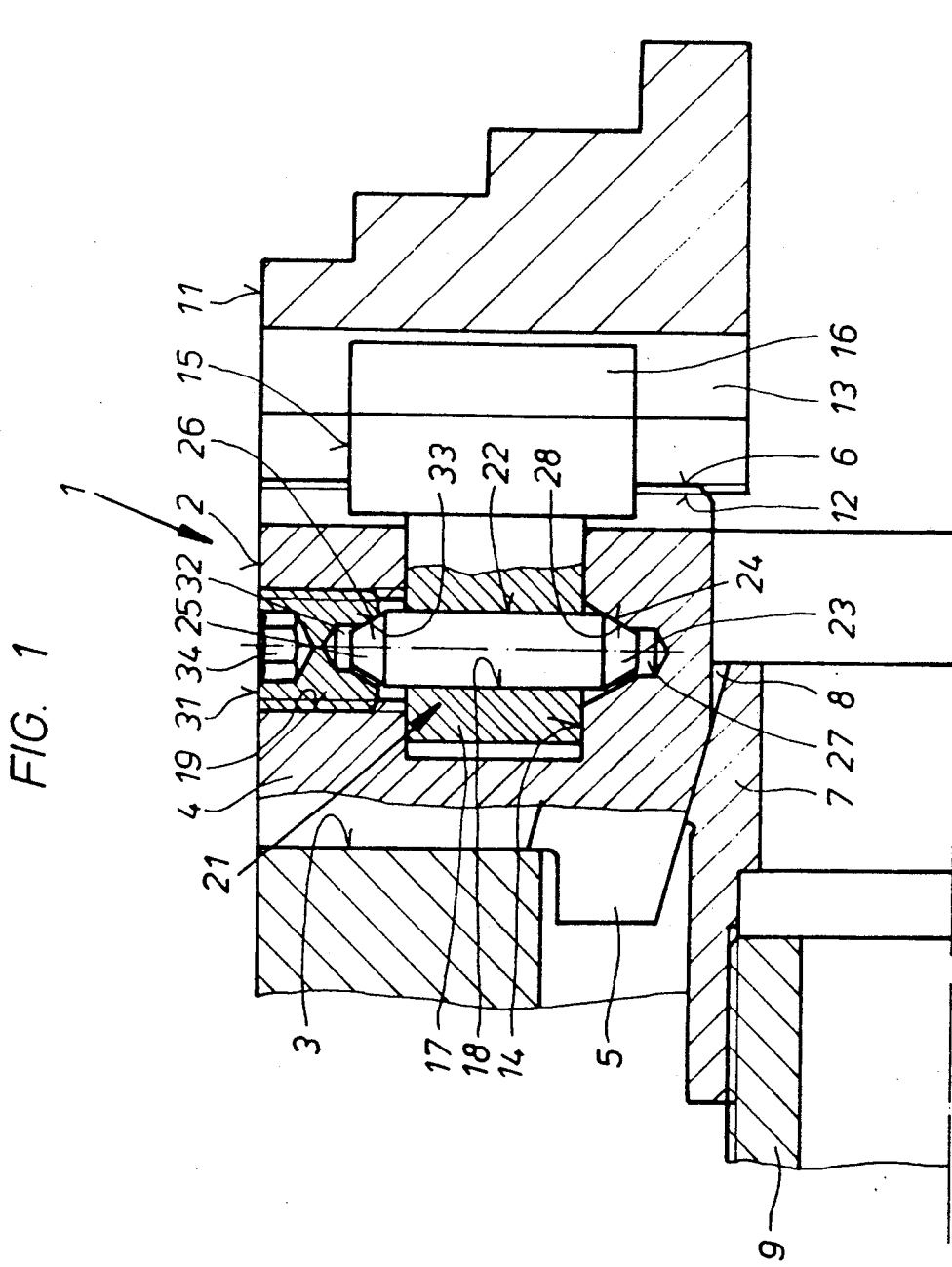
FIG. 1 shows an axial cross-sectional view of the exchangeable clamping jaws of a chuck.
Figure 2:
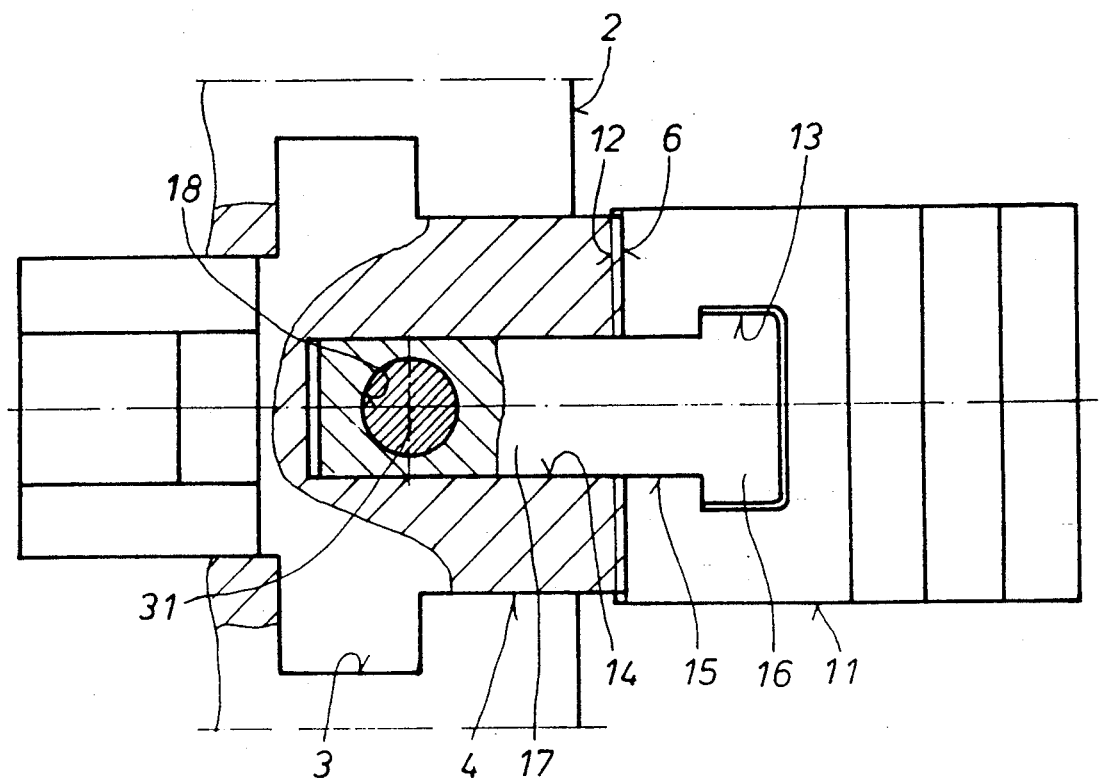
FIG. 2 is a plan view of a base jaw-clamping jaw arrangement of the chuck according to FIG. 1.

The clamping device of the present invention is primarily characterized by a chuck body having radially extending receiving grooves; a jaw arrangement, comprising a plurality of base jaws and a plurality of clamping jaws coupled to one another by respective keys; the base jaws are disposed in the receiving grooves of the chuck body in a radially adjustable manner, with each one of the base jaws having a first toothing at a face thereof and a respective guiding recess in an axial direction of the chuck body; each clamping jaw has second toothings at a face thereof that intermesh with the first toothings of the base jaw, and the clamping jaw is provided with a guiding groove that is aligned with the guiding recess of the base jaw so that the guiding recess forms an extension of the guiding groove; the respective key is inserted into the guiding recess and the guiding groove, whereby the key has a bore within the shaft of the key, the bore extending perpendicularly to the guiding recess; and an adjustment means for adjusting the key in an axial direction of the key shaft the adjustment means comprising at least one clamp bolt being positioned in the bore of the key shaft and a threaded element for moving the clamp bolt in the bore, thereby causing axial displacement of the key, the clamp bolt having at least one clamping surface, inclined relative to an axis of the clamp bolt, at ends of the clamp bolt, the clamping surface cooperating with a respective counter surface provided within the jaw arrangement.

The clamping surfaces may be spherical or conical. The clamp bolt may extend in a radial direction of the chuck body or perpendicularly to a longitudinal direction of said guiding groove.

In a preferred embodiment the bore of the key shaft is provided with the respective counter surface and the clamping surface is disposed at a portion of the clamp bolt positioned within the bore of the key shaft, whereby the clamping surface is at least partially conically shaped. The threaded element in this embodiment is in the form of a threaded extension of the clamp bolt.

It is preferred that the threaded extension is positioned at a radially outer end of the clamp bolt. Furthermore, it is expedient that a counter piece with a conical surface is inserted into a cutout of the base jaw into which a radially inner end of the clamp bolt is inserted. The conical surface is arranged mirror-symmetrically to the clamping surface of the bolt and cooperates with a further counter surface provided within the bore of the key shaft.

In a preferred embodiment two clamping bolts are provided which are arranged mirror symmetrically to one another within the bore of the key shaft. In a further embodiment the threaded element is in the form of a threaded spindle that is rotatably mounted within either the base jaw or the clamping jaw and has a recessed portion with a respective counter surface. The clamp bolt then has a first and a second clamping surface at ends thereof. The clamp bolt extends with its radially inwardly oriented end into a further recess of the base jaw or the clamping jaw, whereby the further recess has a respective counter surface that cooperates with the first clamping surface. The second champing surface cooperates with the counter surface of the threaded spindle whereby a rotation of the threaded spindle acts on the clamp bolt.

It is preferred that the bore is cylindrically shaped and that the recessed portion and the further recess are arranged coaxially to the bore. It is also possible to displace the further recess relative to the recessed portion of the threaded spindle in a direction towards a head of the threaded spindle in a direction towards a head of the key, whereby furthermore the clamping surfaces of the clamp bolt are spherical. The bore may have a concave longitudinal cross-section or the clamp bolt may have a convex longitudinal cross-section.

In a preferred embodiment the further recess is provided within a cylindrical insert that is inserted into the base jaw or the clamping jaw respectively. Furthermore, the recessed portion of the threaded spindle may be provided within a cylindrical insert that is inserted into the threaded spindle.

In a preferred embodiment the guiding recess of the base jaw respectively the guiding groove of the clamping jaw may be provided with respective undercuts.

According to the present invention the adjustment means may be in the form of one or two clamp bolts which extend through the shaft of the key in a radial direction or in a direction that is perpendicular to the longitudinal axis of the guiding groove which receives the head of the key or may be provided as a clamp bolt which extends only partially into the key. The clamp bolt is supported either directly at respective counter surfaces of the key or at respective counter surfaces of a threaded spindle. One or two respective clamping surfaces are provided at the clamp bolt which are slanted relative to the axial direction thereof and are shaped either spherically or conically. The threaded spindle is provided in a rotatable manner within either the base jaw or the clamping jaw and by rotating the threaded spindle the key is adjusted via the counter surfaces of the threaded spindle respectively of the key itself in the axial direction of the key shaft.

It is expedient to provide a bore within the key for receiving the clamp bolt whereby the clamp bolt with its radially inwardly oriented end extends into a further recess provided at the base jaw or the clamping jaw. The further recess has conically or spherically shaped counter surfaces. The radially outwardly oriented end of the clamp bolt is supported at counter surfaces of the threaded spindle which are also spherically or conically shaped. When a cylindrical bore is provided at the key shaft it is expedient to arrange the further recess within the base jaw or the clamping jaw as well as the recessed portion of the threaded spindle coaxially relative to one another.

In another embodiment of the present invention the radially inwardly oriented end of the clamp bolt is inserted into a further recess which is displaced in the direction of the head of the key with respect to the recessed portion of the threaded spindle. In this embodiment the bore which receives the clamp bolt, respectively the champ bolt itself, are provided with a concave longitudinal cross-section respectively a convex longitudinal cross-section.

It is furthermore expedient to provide the further recesses for receiving the inwardly oriented end and/or the outwardly oriented end of the clamp bolt in cylindrical inserts which are inserted into the base jaws respectively the clamping jaws or the threaded spindle.

In another embodiment the clamp bolt which engages the key shaft partially or entirely may be provided with a conical clamping surface in this engaging area which cooperates with a respective counter surface provided at the key shaft. The threaded spindle may then be provided in the form of a threaded extension of the clamp bolt or in the form of a nut which is fixedly connected to the clamp bolt. It is furthermore possible to provide two mirror-symmetrically arranged clamp bolts within the base jaws or the clamping jaws with respective threaded extensions or nuts fixedly connected to one end of the clamp bolt for moving the clamp bolts within the key shaft.

Furthermore, the clamp bolt may be provided with a threaded extension extending past the clamping surface in an axial direction of the clamp bolt which may be inserted into a respective counter piece that is fixedly connected to the base jaws or the clamping jaws and has a clamping surface which is mirror-symmetrical to the clamping surface of the clamp bolt and cooperates with a further counter surface provided at the key shaft respectively at the bore of the key shaft.

With the clamping device of the present invention it is possible, for example, in a turning lathe to couple respective clamping jaws to the base jaws in a very short time or to release the respective connection in a short time. At the same time, an extremely high stability of the base jaws-clamping jaws-arrangement is provided so that very high clamping forces may be transmitted without difficulties.

When, as suggested by the present invention, a clamping bolt is provided as the respective adjustment means the axial displacement is transmitted to the key via respective clamping surfaces so that the base jaws and clamping jaw are not unnecessarily weakened but are constantly arrested and supported by the key and the resulting forces are distributed over great surface areas so that a rigid connection is ensured.

It is furthermore advantageous that the key is directly actuated by the clamp bolt since the connection between the clamping jaws and the base jaws may be released or fastened in a short period of time and the required amount of travel for the respective adjustment by the threaded element is small. However, a sufficient displacement of the key is achieved. Furthermore, the clamping jaws which are not provided with any arresting screws may be entirely used and may be operated at full speed. The individual components may be produced in a simple and economic manner.

DESCRIPTION OF PREFERRED EMBODIMENTS

The present invention will now be described in detail with the aid of several specific embodiments utilizing FIGS. 1 through 6.

The chuck 1 represented in FIG. 1 comprises essentially a chuck body 2, and base jaws 4 which are disposed in radially oriented grooves 3 of the chuck body. The base jaws 4 are provided with integral wedge hooks 5. Clamping jaws 11 are coupled to the base jaws 4 in an exchangeable manner. For the adjustment of the base jaws 4, an adjustment piston 7 which is provided with a wedge hook 8 is provided which is actuated by a non-represented servo device via an axially slidable pull rod 9 that is screwed to the adjustment piston 7. When the adjustment piston 7 is moved in the axial direction, the base jaws 4 are radially inwardly or outwardly displaced and the wedge hooks 5 engage the wedge hook 8 of the adjustment piston whereby the axial movement of the adjustment piston 7 is transformed into a radial displacement.

The coupling of the clamping jaws 11, which are provided with toothings 12 that engage respective toothings 6 of the base jaws 4, to the base jaws 4 a key 15 is provided. The key 15 has a shaft 17 that is inserted into a guiding recess 14 of the base jaws 4 and has a head 16 which is inserted into a guiding groove 13 of the clamping jaws whereby the guiding groove 13 is provided with undercuts. The guiding recess 14 and the guiding groove 13 together form a T-shape. The key 15 is slidable within the respective guiding recess 14 and guiding groove 13. The clamping of the head 16 of the key 15 within the guiding groove 13 is accomplished by an adjustment means 21 comprising a clamp bolt 22 which extends through a bore 18 provided within the shaft 17 of the key 15. The radially inwardly oriented end 23 of the clamp bolt 22 is provided with a conical clamping surface 24 and the radially outwardly oriented end 25 of the clamp bolt 22 is provided with a conical clamping surface 26. Counter surfaces 28 respectively 33 which cooperate with the clamping surfaces 24 and 26 of the clamp bolt 22 are provided at a further recess 27 in the base jaws 4 respectively a recessed portion 32 within the threaded element in the form of a threaded spindle 31. The threaded spindle 31 is screwed into a respective threaded bore 19 provided at the base jaw 4. The further recess 27 and the recessed portion 32 are arranged coaxially relative to one another.

The key 15 is adjustable by the clamp bolt 22 in its longitudinal direction at least by the height of the intermeshing toothings 6 and 12 of the base jaws 4 and the clamping jaws 11. This is achieved by providing a respective free space between the clamping surfaces 24 and 26 of the clamp bolt 22 as well as the respective cooperating counter surfaces 28 and 33 within the recess 28 and the recessed portion 32. When a respective clamping jaw 11 is to be exchanged, the threaded spindle 31 must be turned radially outwardly to such an extent that the clamp bolt 22 may be displaced to the right by an amount corresponding to the height of the toothings 6, 12 so that the clamping jaw 11 is sufficiently radially displaced or may be removed from the head 16 of the key 15.

When the threaded spindle 31 is moved radially inwardly by a respective tool to be inserted into the insertion opening 34 of the threaded spindle 31, the clamping surface 26 of the clamp bolt 22 is engaged by the counter surface 33 of the threaded spindle 31 and the clamp bolt 22 is accordingly moved inwardly, whereby the counter surface 28 provided at the base jaw 4 cooperating with the clamping surface 24 supports this movement. Due to this adjustment movement of the clamp bolt 22, the key 15 which rests at the clamp 22 is also displaced to the left and is thus moved in the direction of its shaft 17 whereby the head 16 is pressed against the clamping jaws 11 within the guiding groove 13. In this manner, the clamping jaw 11 is fixedly coupled to the base jaw 4.

Figure 3:
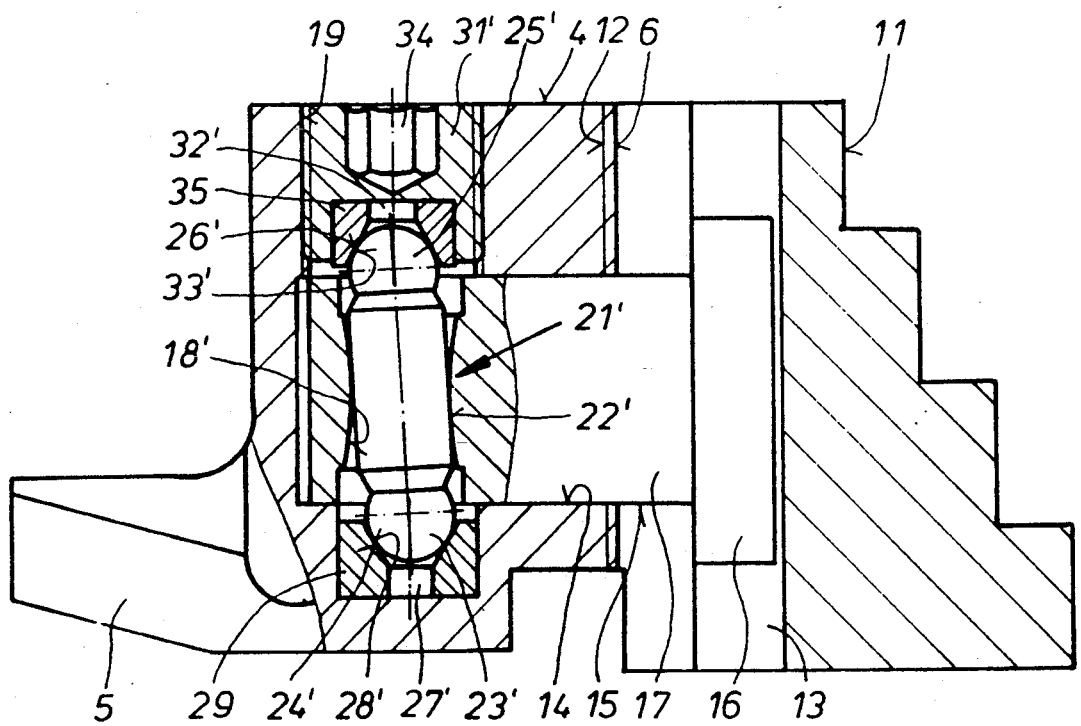
FIG. 3 is another embodiment of the clamp bolt of the chuck according to FIG. 1.

In the embodiment according to FIG. 3 the radially inner end 23' and the radially outer end 25' of the adjustment means 21' (in the form of a clamp bolt 22') are provided with spherical clamping surfaces 24' and 26'. The respective cooperating counter surfaces 28' and 33' however are conically shaped and are provided at inserts 29 and 35 that are inserted into the base jaws 4 and the threaded element in the form of a threaded spindle 31'. The further recess 27' and the recessed portion 32' which provide the counter surfaces 28' and 33', are displaced relative to one another in the axial direction of the chuck, i e, the recess 27' is displaced in the direction of the head 16 of the key 15 with respect to the recessed portion 32'. The bore 18' within the key shaft 17 is spherically shaped, i.e., has a concave longitudinal cross-section, so that the clamp bolt 22' carries out a pivoting movement when the threaded spindle 31' is moved. Accordingly, the key 15 is pulled to the left and the head 16 within the guiding groove 13 is clamped against the clamping jaws 11.

A variation of the embodiment according to FIG. 3 is shown in FIG. 3a. The clamp bolt 22' has ends 23' and 25' with conically shaped clamping surfaces 24' and 26', while the threaded spindle 31' (or, as an alternative, an insert 35 in the threaded spindle 31') and the base jaw 4 (or, as an alternative, an insert 29 in the base jaw 4) are provided with counter surfaces 28', 33' that are spherically or concavely shaped with a radius R.

A further variation of the embodiment according to FIG. 3 is shown in FIG. 3b. The clamp bolt 22' is convexly shaped relative to its longitudinal axis, and the bore 18' is cylindrical.

Figure 4:
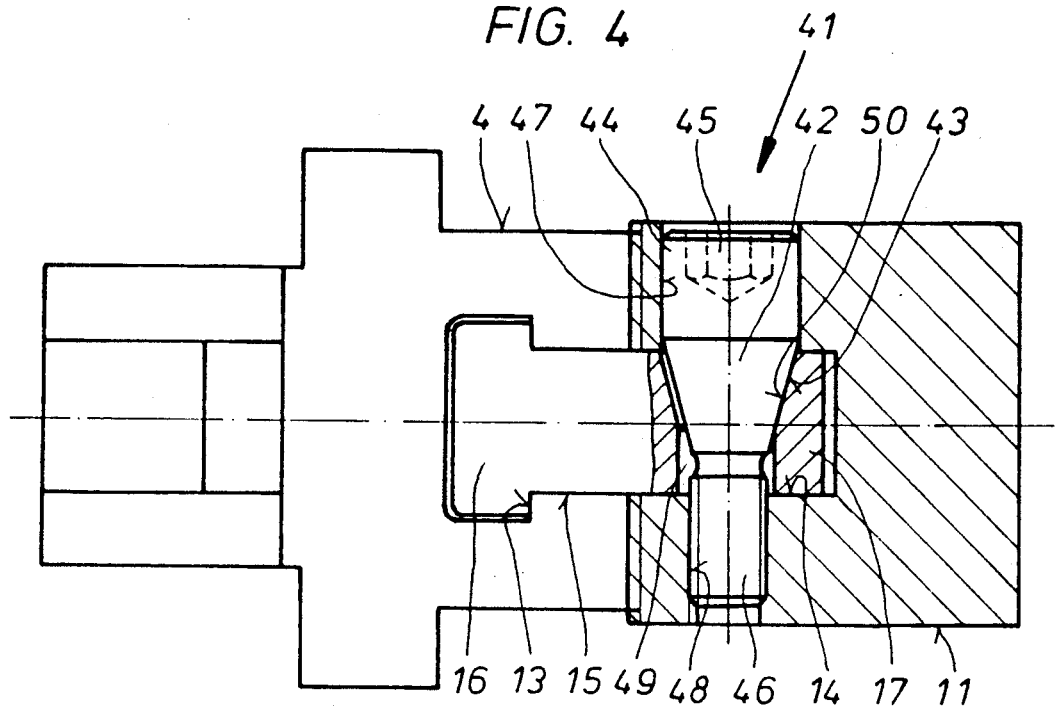
FIG. 4 shows a one-piece clamp bolt inserted into a clamping jaw for adjusting the key of a base jaw-clamping jaw-arrangement of the chuck according to FIG. 1.

According to FIG. 4 the adjustment means 41 is in the form of a one-piece clamp bolt 42. The clamp bolt 42 is provided with a conical clamping surface 43 and is provided with a threaded extension 46 which is screwed into a threaded bore 48 of the clamping jaw 11. The clamp bolt 42 is furthermore provided with a collar 44 which is rotatably supported within a bore 47 of the clamping jaw 11 and has an insertion opening 45 for receiving a respective tool. The clamp 42 extends perpendicularly to a longitudinal direction of the guiding groove 13. The longitudinal direction of the guiding groove 13 corresponds to the direction in which the head 16 of the key 15 is slidable within the guiding groove 13.

The clamping surface 43 of the clamp bolt 42 cooperates with a counter surface 50 which is provided at a recess 49 within the shaft 17 of the key 15. By turning the clamp bolt 42 the key 15 is thus pushed to the right so that the base jaw 4 is fixedly coupled to the clamping jaw 11.

Figure 5:
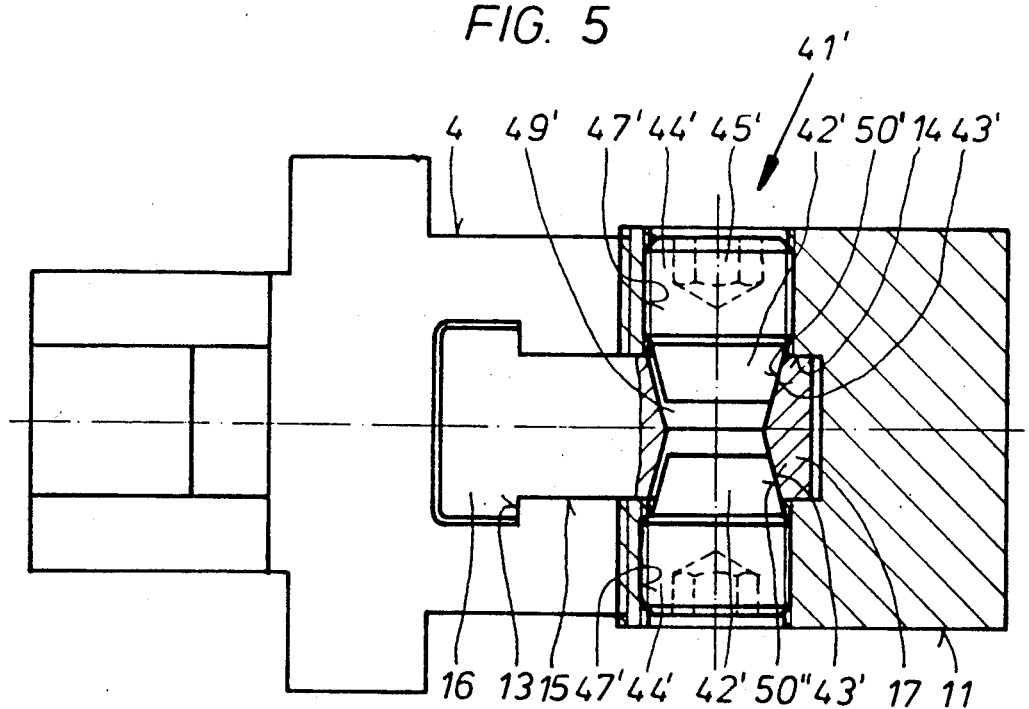
FIG. 5 shows two oppositely arranged one-piece clamp bolts in a representation according to FIG. 4.

The embodiment according to FIG. 5 corresponds essentially to the embodiment according to FIG. 4. The adjustment means 41' comprises two clamp bolts 42' which are provided with conically shaped clamping surfaces 43'. The clamping surfaces 43' cooperate with respectively inclined counter surfaces 50' and 50". These counter surfaces 50', 50" are provided within respective recesses 49' within the key shaft 17. The clamp bolt 42' is provided with a thread element in the form of a collar 44' which is threaded and is screwed into a threaded bore 47' of the clamping jaw 11. The collar 44' is provided with an insertion opening 45' for receiving a respective tool.

Figure 6:
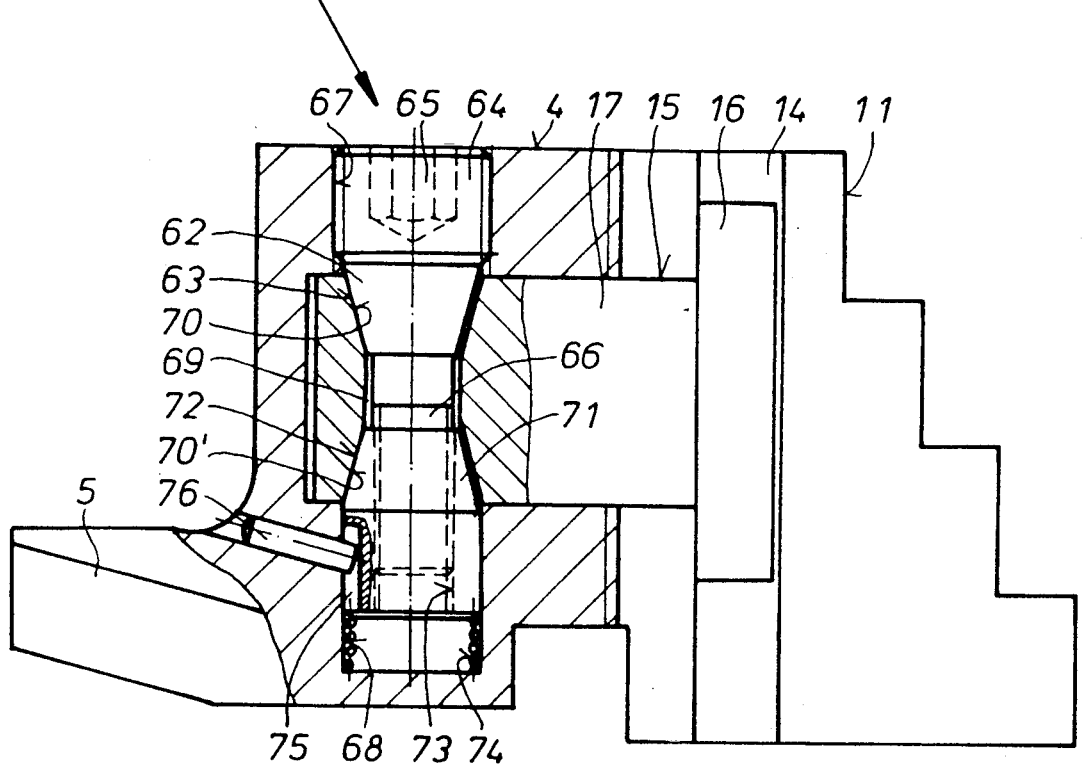
FIG. 6 shows a clamp bolt provided with a conical counter piece and inserted into the base jaws of a chuck according to FIG. 1.

The adjustment means 61 according to FIG. 6 comprises a clamp bolt 62 having a clamping surface 63 and a conical counter piece 71 that is fixedly connected to the base jaw 4 and is disposed in a respective cutout 68 of the base jaw 4. The conical counterpiece 71 is supported by a spring 74 and is also provided with a clamping surface 72. The conical counter piece 71 is provided with an inner thread 73 and is screwed onto a threaded extension 66 of the clamp bolt 63 whereby the position of the conical counter piece 71 within the base jaw 4 is secured by a pin 76 extending into a slot 75.

The threaded element is provided in the form of a collar 64 which is threaded and which is inserted into a threaded bore 67 of the base jaw 4. The collar 64 which is an integral part of the clamp bolt 62 is provided with an insertion opening for a respective tool. The counter surfaces 70 and 70' which cooperate with the clamping surfaces 63 and 72 are provided within recesses 69 within the shaft 17 of the key 15 and are oppositely inclined relative to one another. By rotating the clamp bolt 62 its clamping surface 63 is moved in the direction of the shaft 17 and at the same time the conical counter piece 71 which is screwed onto the threaded extension 66 is also moved so that during the clamping action the key 15 will not be tilted relative to its initial position.

The present invention is, of course, in no way restricted to the specific disclosure of the specification and drawings, but also encompasses any modifications within the scope of the appended claims.

What I claim is:

1. A clamping device, comprising:
   a chuck body having radially extending receiving grooves;
   a jaw arrangement, comprising a plurality of base jaws and a plurality of clamping jaws coupled to one another by respective keys; said base jaws being disposed in said receiving grooves of said chuck body in a radially adjustable manner, with each one of said base jaws having a first toothing at a face thereof and a respective guiding recess in an axial direction of said chuck body; each clamping jaw having a second toothing at a face thereof that intermeshes with said first toothing of said base jaw, and said clamping jaw being provided with a guiding groove that is aligned with said guiding recess of said base jaw so that said guiding recess forms an extension of said guiding groove; said respective key being inserted into said guiding recess and said guiding groove, said key having a bore within a shaft of said key, said bore extending perpendicularly to a longitudinal direction of said guiding recess; and
   an adjustment means for adjusting said key in an axial direction of said key shaft, said adjustment means comprising at least one clamp bolt being positioned in said bore of said key shaft and a threaded element for moving said clamp bolt in said bore, thereby causing axial displacement of said key, said clamp bolt having at least one clamping surface inclined relative to an axis of said clamp bolt at at least one end of said clamp bolt, said clamping surface cooperating with a respective counter surface provided within said jaw arrangement.

2. A clamping device according to claim 1, wherein said clamping surface is spherical.

3. A clamping device according to claim 1, wherein said clamping surface is conical.

4. A clamping device according to claim 1, wherein said clamp bolt extends in a radial direction of said chuck body.

5. A clamping device according to claim 1, wherein said clamp bolt extends perpendicularly to a radial direction of said chuck body.

6. A clamping device according to claim 1, wherein said bore of said key shaft is provided with said respective counter surface and said clamping surface is disposed at a portion of said clamp bolt positioned within said bore of said key shaft, said clamping surface being at least partially conically shaped; and wherein said threaded element is in the form of a threaded extension of said clamp bolt.

7. A clamping device according to claim 6, wherein two of said clamping bolts are provided, arranged mirror-symmetrically to one another within said bore.

8. A clamping device according to claim 6, wherein said threaded extension is positioned at a radially outer end of said clamp bolt.

9. A clamping device according to claim 8, wherein a counter piece with a conical surface inserted into a cutout of said base jaw is provided into which a radially inner end of said clamp bolt is inserted, with said conical surface being arranged mirror-symmetrically to said clamping surface of said bolt and cooperating with a further counter surface provided within said bore of said key shaft.

10. A clamping device according to claim 1, wherein:
    said threaded element is in the form of a threaded spindle that is rotatably mounted within said base jaw and has a recessed portion with a respective counter surface;
    said clamp bolt has a first and a second one of said clamping surfaces at said ends thereof;
    said clamp bolt with a radially inwardly oriented end thereof extends into a further recess of said base jaw, said further recess having a respective counter surface cooperating with said first clamping surface; and
    said second clamping surface cooperates with said counter surface of said threaded spindle, whereby a rotation of said threaded spindle acts on said clamp bolt.

11. A clamping device according to claim 10, wherein said bore is cylindrically shaped and said recessed portion and said further recess are arranged coaxially to said bore.

12. A clamping device according to claim 10, wherein said further recess is displaced relative to said recessed portion of said threaded spindle in a direction towards a head of said key and said clamping surfaces of said clamp bolt are spherical.

13. A clamping device according to claim 12, wherein said bore has a concave cross-section relative to a longitudinal axis of said bore.

14. A clamping device according to claim 12, wherein said clamp bolt has a convex cross-section relative to a longitudinal axis of said clamp bolt.

15. A clamping device according to claim 10, wherein said further recess is provided within a cylindrical insert that is inserted into said base jaw.

16. A clamping device according to claim 10, wherein said recessed portion is provided within a cylindrical insert that is inserted into said threaded spindle.

17. A clamping device according to claim 1, wherein said guiding recess is provided with an undercut.

18. A clamping device according to claim 1, wherein said guiding groove is provided with an undercut.

19. A clamping device according to claim 1, wherein:
    said threaded element is in the form of a threaded spindle that is rotatably mounted within said clamping jaw and has a recessed portion with a respective counter surface;
    said clamp bolt has a first and a second one of said clamping surfaces at said ends thereof;

said clamp bolt with a radially inwardly oriented end thereof extends into a further recess of said clamping jaw, said further recess having a respective counter surface cooperating with said first clamping surface; and said second clamping surface cooperates with said counter surface of said threaded spindle, whereby a rotation of said threaded spindle acts on said clamp bolt.

20. A clamping device according to claim 19, wherein said bore is cylindrically shaped and said recessed portion and said further recess are arranged coaxially to said bore.

21. A clamping device according to claim 19, wherein said further recess is displaced relative to said recessed portion of said threaded spindle in a direction towards a head of said key and said clamping surfaces of said clamp bolt are spherical.

22. A clamping device according to claim 21, wherein said bore has a concave cross-section relative to a longitudinal axis of said bore.

23. A clamping device according to claim 21, wherein said clamp bolt has a convex cross-section relative to a longitudinal axis of said clamp bolt.

24. A clamping device according to claim 19, wherein said recess is provided within a cylindrical insert that is inserted into said base jaw.

25. A clamping device according to claim 19, wherein said recessed portion is provided within a cylindrical insert that is inserted into said threaded spindle.

26. A clamping device according to claim 1, wherein said counter surface is spherical.

27. A clamping device according to claim 1, wherein said counter surface is conical.

* * * * *